United States Patent [19]

Feld

[11] 4,138,939
[45] Feb. 13, 1979

[54] VEGETABLE STEAMER

[75] Inventor: Gerald M. Feld, Van Nuys, Calif.

[73] Assignee: Trend Products Company, North Hollywood, Calif.

[21] Appl. No.: 857,609

[22] Filed: Dec. 5, 1977

[51] Int. Cl.² .................. A47J 37/00; A47J 43/24
[52] U.S. Cl. ............................. 99/418; 99/450; 16/114 R
[58] Field of Search .............. 99/415, 449, 450, 485, 99/646 R; 16/114 R, 114 A, DIG. 25; 99/416, 418

[56] References Cited

U.S. PATENT DOCUMENTS

| 116,226 | 6/1871 | Seipt | 16/114 |
| 222,296 | 12/1879 | Murray | 16/114 |
| 880,734 | 3/1908 | Hecht | 16/114 |
| 1,300,565 | 4/1919 | Bowers | 99/418 |
| 2,667,117 | 1/1954 | Millard | 99/418 |
| 3,324,787 | 6/1967 | McCleary | 99/319 |

FOREIGN PATENT DOCUMENTS 736449   9/1932   France .................... 16/114 R

Primary Examiner—Robert W. Jenkins
Attorney, Agent, or Firm—Irvin A. Lavine

[57] ABSTRACT

A vegetable steamer has a perforated base plate to which a plurality of overlapping hingedly movable leaves are attached. Base legs are self-riveted to the base plate. A pair of parallel straps are provided slightly above the base plate, and having ends integral therewith. A detachable resilient handle has an upper circular portion, a pair of depending handle legs extending from the arcuate portion, and a lifting tab extending outwardly from the lower end of each handle leg and passing through a strap.

4 Claims, 6 Drawing Figures

VEGETABLE STEAMER

BACKGROUND OF THE INVENTION

The present invention relates to vegetable steamers.

Vegetable steamers have been known for a long period of time in the prior art. Generally, they comprise a basket-like device, often made of non-contaminating metal which has been perforated.

MILLARD ET AL U.S. Pat. No. 2,667,117 discloses a vegetable steamer of the type having a base plate, depending legs supported from the base plate, and a plurality of overlapping hingedly movable leaves. A handle is provided, connected to the base plate by a screw threaded arrangement, in a modified form, a detachable handle is provided, which includes a fork-like device for engagement with the bulbous head of a bushing 35 secured to the base plate of the steamer. The threaded connection is relatively expensive to manufacture, and in repeated use, particularly by persons of limited manual dexterity, the threads are apt to be stripped. In addition, the threaded connection is difficult to clean, providing a possible source of contamination. The alternate embodiment requires an expensive fork attachment which is provided with movable elements, together with a trigger mechanism to move them, in order to engage the bulbous head for lifting the steamer.

McMURRAY U.S. Pat. No. 222,296 discloses a vegetable steamer in which legs extend upwardly through slots in the perforated base plate, the legs providing loops or straps. A handle is provided in the form of a resilient, arcuate member having tabs extending through the straps provided by the legs. When this structure is to be cleaned, it must be completely disassembled, and the re-assembly is accomplished only with substantial difficulty.

BOWERS ET AL U.S. Pat. No. 1, 300,565 discloses a toasting device with a handle having at each end a pair of oppositely extending tabs, which may be spring urged, which tabs enter into eyes formed on a supporting ring structure of the toaster device. The legs of the handle attachment structure are moved towards each other in order to collapse the legs to a position in which they are only narrowly spaced, to permit withdrawal of the tabs from the eyes, but it is not required that the legs engage each other, and therefore, accidental disengagement is possible.

McCLEARY U.S. Pat. No. 3,324,787 discloses a tea infuser having a handle which is locked to a base plate, the handle at its lower end having reversely bent prongs which prevent detachment of the handle, unless the prongs are bent. Repeated bending would quickly cause breakage of the prongs.

SUMMARY OF THE INVENTION

The vegetable steamer disclosed herein includes a base plate having a pair of spaced apart straps which are parallel, and which are preferably struck up from the base plate, so that they extend above the plane of the top of the base plate. A detachable handle is provided which includes a pair of depending legs, each leg having a tab at the lower end, the tabs extending oppositely, with each tab extending between a strap and the base plate. At their upper ends, the legs are connected by an integral generally circular portion which is resilient, and which urges the legs apart. The legs are in alignment, and the legs are of arcuate transverse cross section, the concavities being in facing relationship. The legs diverge outwardly and downwardly, from the connecting arcuate portion at their upper ends. The outward spread of the legs is stopped by the inner boundaries of the two straps. The legs may be moved relative to each other, into a second position in which the lower ends of the legs are closer together, in this second position, the legs being still in alignment, and their upper ends being in engagement. In this second position, it is not possible to withdraw the handle from the straps, since the distance between the straps is less than the distance between the lower end of one of the legs and the outer end of the tab of the other leg. Movement of the legs towards each other is facilitated by a shifting of the legs out of alignment, so that an edge of one leg is received in the concavity of the other leg, thus permitting complete withdrawal of one of the tabs from the strap with which it is associated, while the opposite leg remains engaged with the other strap. Thus, complete removal may be effected, and the steamer cleaned without difficulty. A re-assembly of the handle to the base plate is equally facile, requiring no manual dexterity. Supporting legs for the base plate are provided by self-rivets, depending therefrom.

Among the objects of the present invention are to provide a vegetable steamer which has a releasable handle for permitting cleaning of the parts thereof, and another object of the present invention is to provide such a construction in which the release of the handle does not require great manual dexterity. Another object of the present invention is to provide a vegetable steamer having a releasable handle, which is of extremely simple and economical construction, while being readily disassembled for cleaning.

Other objects and many of the attendant advantages of the present invention will be readily apparent from the following specification, claims and drawings.

DESCRIPTION OF THE PREFERRED EMBODIMENT

Figure 1:
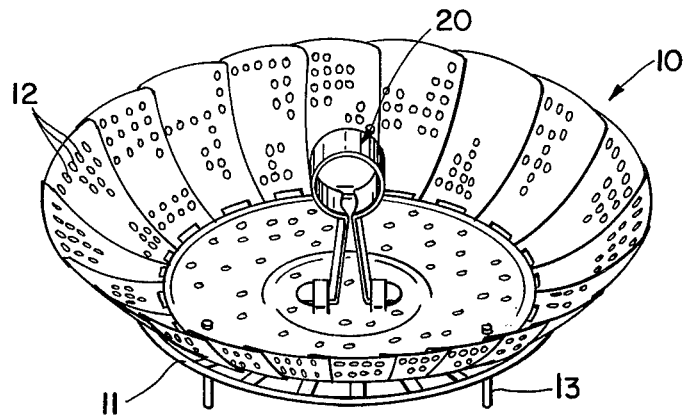
FIG. 1 is a perspective view of a vegetable steamer in accordance with the present invention.

Referring now to the drawings, wherein like or corresponding reference numerals are used to designate like or corresponding parts throughout the several views, there is shown in FIG. 1 a vegetable steamer generally designated 10, and comprising a base plate 11, and a plurality of overlapping leaves 12 which are hingedly connected to the base plate 11. Base supporting legs 13 are provided, and are secured to the base plate (see FIG. 3) by a self-riveted construction, including heads or enlargements 13a and 13b above and below the base plate 11, and engaging its upper and lower surfaces. A handle 20 may be seen extending upwardly in FIG. 1.

Figure 2:
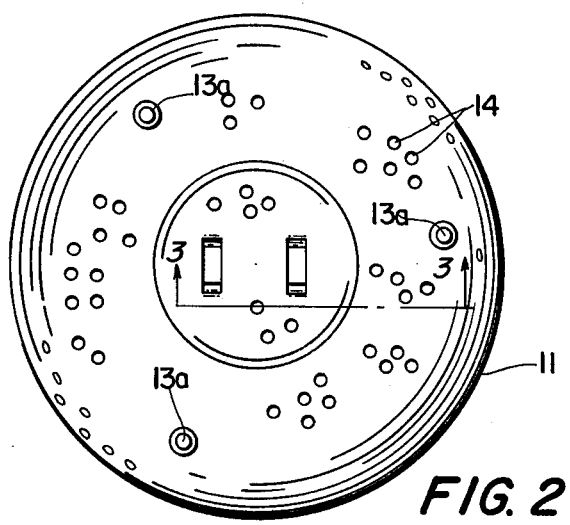
FIG. 2 is a plan view of the base plate of the steamer of FIG. 1, with the handle removed.

Referring to FIG. 2, there may be seen the base plate 11 with perforations 14 thereabout, as well as the heads 13a of the base supporting legs 13. In addition, near the center of the base plate 11 there are provided a pair of straps 15a and 15b, which are struck up from the base plate 11, and extend in parallel relationship to each other. The handle 20 is not shown in FIG. 2, for purposes of clarity.

Figure 3:
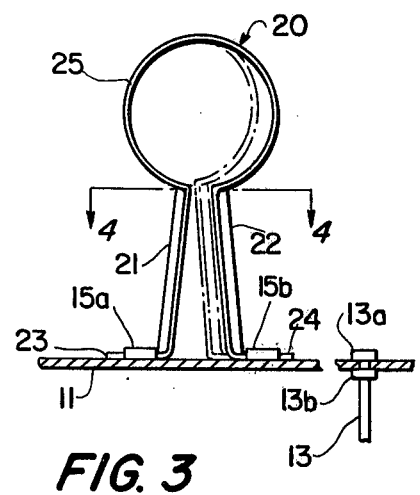
FIG. 3 is a cross sectional view taken on the line 3—3 of FIG. 2, but with the handle in place.

FIG. 3 discloses the base plate 11 in cross section, with the handle 20 in attached position. Handle 20 may be seen to comprise a pair of legs 21 and 22, having tabs 23 and 24, respectively, at their lower ends. The tab 23 is inserted into the strap 15a, passing between the strap 15a, and the upper surface of base plate 11. The tab 24 is similarly positioned relative to the strap 15b. As is apparent from FIG. 3, the tabs 23 and 24 extend oppositely, so that their free ends are located remotely from each other. The legs 21 and 22 are integrally connected with the tabs 23 and 24 at their inner ends.

At their upper ends, the handle legs 21 and 22 are integrally connected and urged apart by a resilient arcuate element or portion 25, made of a suitable resilient material such as spring steel, and urging the legs 21 and 22 away from each other. As is apparent, the upper ends of the handle legs 21 and 22 are closer together than 25 their lower ends, in the full line position shown in FIG. 3, so that the legs 21 and 22 diverge outwardly from the arcuate portion 25. As is apparent, the outward diverging of the legs 21 and 22 is limited by the engagement of the lower ends of the legs 21 and 22 with the inner edges of the straps 15a and 15b, respectively.

Figure 4:
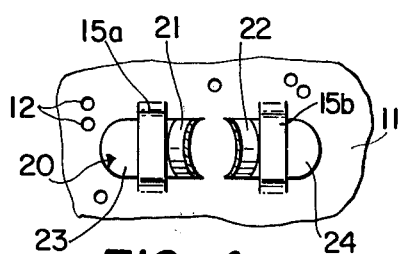
FIG. 4 is a cross sectional view taken on the line 4—4 of FIG. 3.

Referring now to FIG. 4, there may be seen a cross sectional view taken on the line 4—4 of FIG. 3, and in this view, it is apparent that the leg 21 and the leg 22 are transversely concave, and in facing relationship. In addition, the legs 21 and 22 are in alignment, with the lateral edges of one leg being in the same plane as the corresponding lateral edges of the other leg. Further, it will be seen that the tabs 23 and 24 extend beneath and through the straps 15a and 15b, and that the lower ends of the legs 21 and 22 engage the sides of the straps 15a and 15b.

Figure 5:
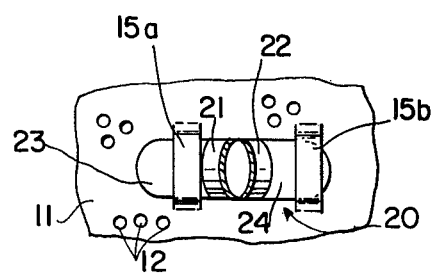
FIG. 5 is a view similar to FIG. 4, but showing the parts in a second position, prior to release of the handle from the base plate.

Referring to FIG. 5, the leg 22 has been moved to the left, to a second position, this being the same position as that shown in dashed lines in FIG. 3. In this second position, the lower ends of the legs 21 and 22 are closer together than in the fully expanded position shown in FIGS. 3 and 4, and in this second position the legs 21 and 22 are still in alignment. As seen in FIG. 5, the upper ends of legs 21 and 22 are in engagement with each other. As is apparent, the distance between the straps 15a and 15b is less than the distance between leg 21 and the outer end of tab 24, so that it may be seen that in this second position as illustrated in FIG. 5, the handle 20 is not removable from the base plate 11.

Figure 6:
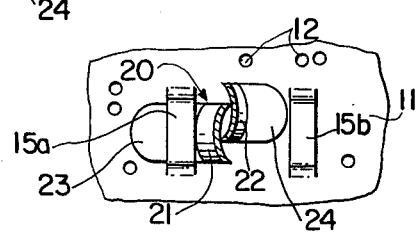
FIG. 6 is a view of the parts in a third position, showing the handle in release position.

In FIG. 6, there is shown the third position of the handle 20, in which leg 22 has been shifted laterally relatively to leg 21, thereby permitting leg 22 to be moved further away from the strap 15b. In this position, the distance between the leg 21 and the outer end of the tab 24 is less than the distance between straps 15a and 15b. The lateral shifting of the leg 22 is facilitated by a cam-like action, which is permitted by the resilient arcuate portion 25, a lateral edge of leg 21 entering into the concavity of the leg 22, and a lateral edge of the leg 22 the concavity of the leg 21. This permits the complete withdrawal of the tab 24 from the strap 15b, so that the distance between leg 21 and the outer end of tab 24 is now less than the distance between the straps 15a and 15b. In this third position, the handle 20 may be rotated about a vertical axis, with the tab 23 remaining beneath the strap 15a, until the tab 24 is removed from the vicinity of the strap 15b, and after which movement the tab 23 may be withdrawn from the strap 15a in order to completely remove the handle 20 from engagement with the base plate 11.

There has been provided a vegetable steamer having a releasable handle for permitting cleaning of the parts thereof, the manipulation of the handle being relatively easy, and not requiring manual dexterity. This is due to the propensity for the handle 20, when the legs 21 and 22 are moved towards each other, as shown in FIG. 5, to shift to the position of FIG. 6, if the lateral edges of the legs 21 and 22 actually engage each other as shown in FIG. 5, so that the handle 20 itself has a somewhat twisting motion to achieve the FIG. 6 or third position. Further, the herein provided vegetable steamer is of extremely simple and economical construction, and may be readily reassembled. The handle is made of a single piece of resilient material, formed over part of its length into the concave leg portions, and then bent to provide the tabs and the resilient arcuate portion.

It will be obvious to those skilled in the art that various changes may be made without departing from the spirit of the invention, and therefore the invention is not limited to what is shown in the drawings and described in the specification but only as indicated in the appended claims.

I claim:

1. In a vegetable steamer comprising a perforated base plate, supporting base legs therefor, a plurality of overlapping, hingedly movable perforated leaves attached thereto, and a handle, the improvement comprising:

(a) a pair of spaced, parallel straps carried by said base plate near the center thereof and lying above said base plate, and (b) said handle comprising a pair of lifting tabs each passing between a said strap and said base plate, and upwardly extending handle legs connected to each said lifting tab and providing said handle for lifting said steamer, said handle legs being transversely concave and in facing relationship, resilient means connected to said handle legs at their upper ends for urging said handle legs apart, said handle legs diverging outwardly from their upper ends, said handle being detachable from said base by urging said handle legs toward each other and withdrawing a said tab from a said strap, said handle legs being in alignment when said tabs extend through said straps, the upper ends of said handle legs engaging upon said handle legs being moved toward each other, the distance between the lower end of one of said handle leg and the outer end of the tab on the other said handle leg being greater than the distance between said straps upon initial engagement of said handle legs upper ends, said resilient means permitting said one handle leg to shift laterally following said engagement to effect misalignment of said handle legs and entry of a lateral edge of each handle leg into the concavity of the other said handle leg, the distance between the lower end of one said handle leg and the outer end of the tab of the other said handle leg being no greater than the distance between said straps when said handle legs are moved to said last mentioned position.

2. In a vegetable steamer, a base plate and a releasable handle connected thereto, said base plate comprising a pair of spaced, parallel straps lying above the surface of said base plate, said handle comprising a pair of legs, a tab at the lower end of each leg, said tabs extending oppositely, each said tab extending between a said strap and the base plate, resilient means urging said legs apart, said legs being in alignment and engaging said straps in a first position thereof, said legs being movable to a second position in which the lower ends of said legs are closer together than in said first position and in which second position said legs are in alignment and in engagement with each other, and wherein the distance between said straps is less than the distance between one said leg and the outer end of the tab of the other said leg, and means for shifting said leg laterally relatively to the other leg and for permitting further movement of one said leg toward the other said leg, said distance between one said leg and the outer end of the tab of the other said leg upon said further movement of one said leg being less than the distance between said straps, whereby to permit release of said handle from said base plate upon said further movement of said leg.

3. The structure of claim 2, said legs being concave and in facing relationship, said last mentioned means comprising engaging edges and surfaces of said legs.

4. The structure of claim 3, said resilient means comprising an arcuate spring integral at its ends with the upper ends of said legs.

* * * * *